May 29, 1934.  E. R. FELLOWS  1,960,841
MACHINE FOR FINISHING GEARS
Filed Dec. 19, 1925  3 Sheets-Sheet 1
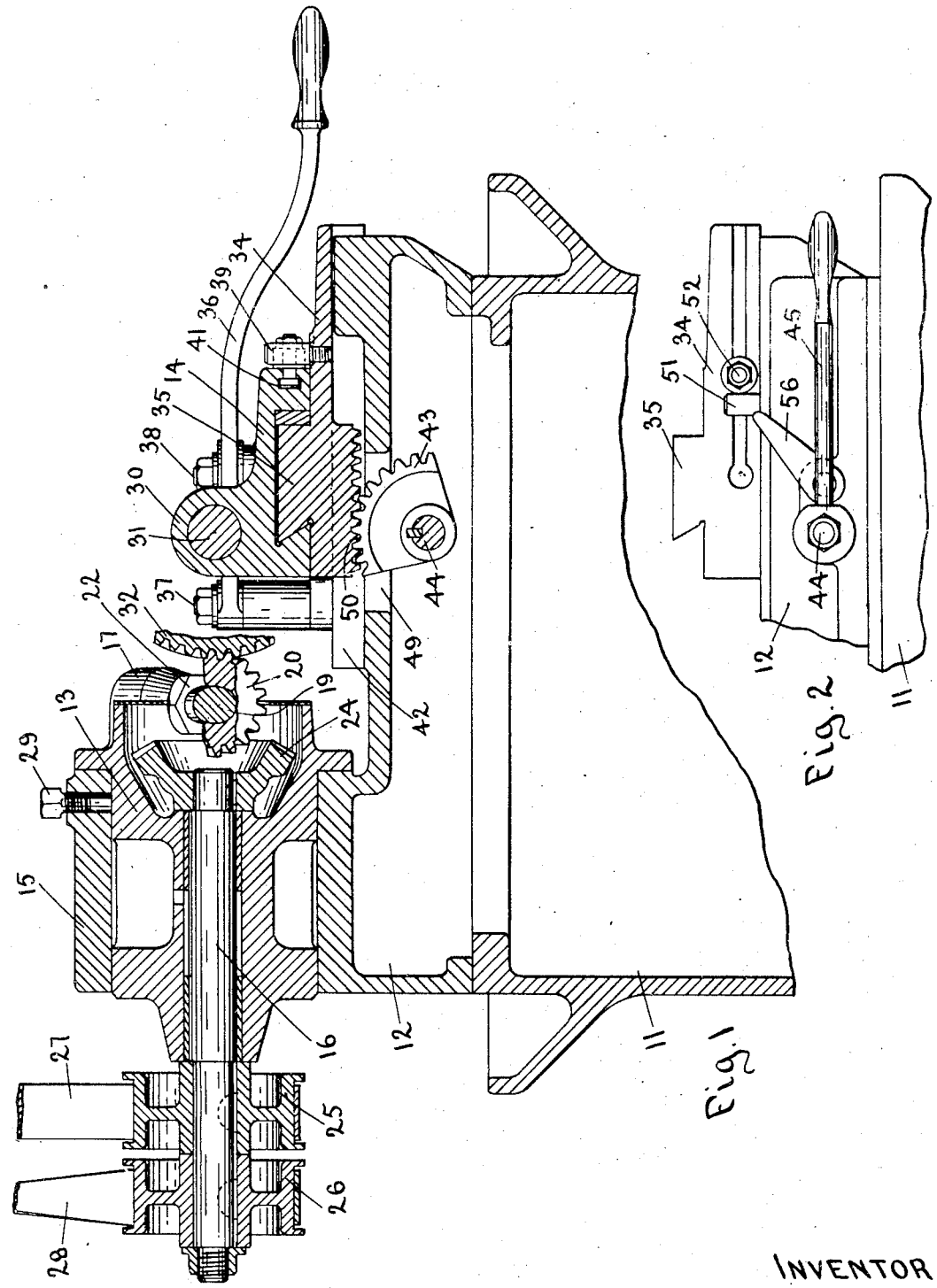
INVENTOR
Edwin R. Fellows
by Wright, Brown, Quinby & May
attys.

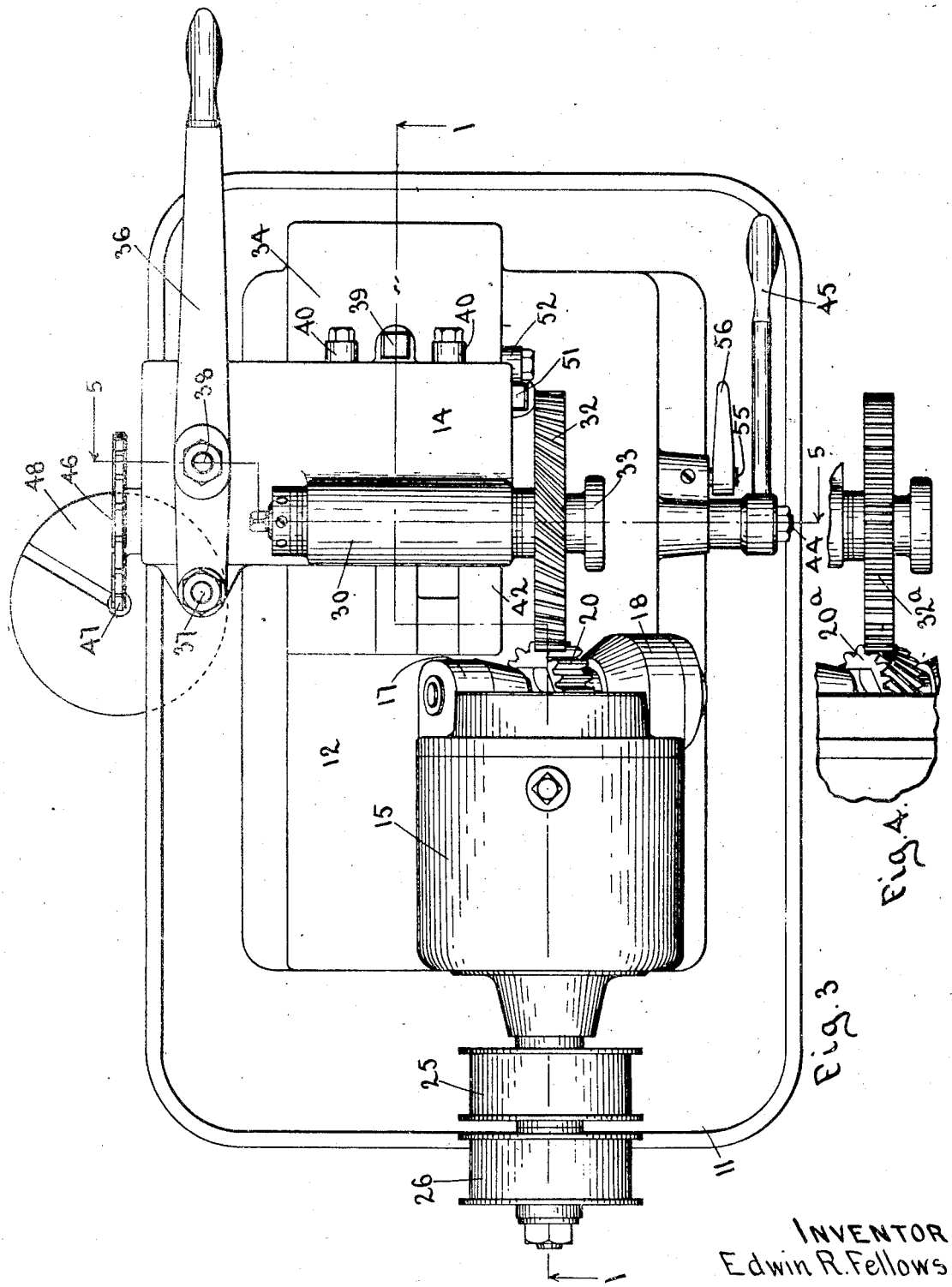

May 29, 1934.  E. R. FELLOWS  1,960,841
MACHINE FOR FINISHING GEARS
Filed Dec. 19, 1925   3 Sheets-Sheet 3
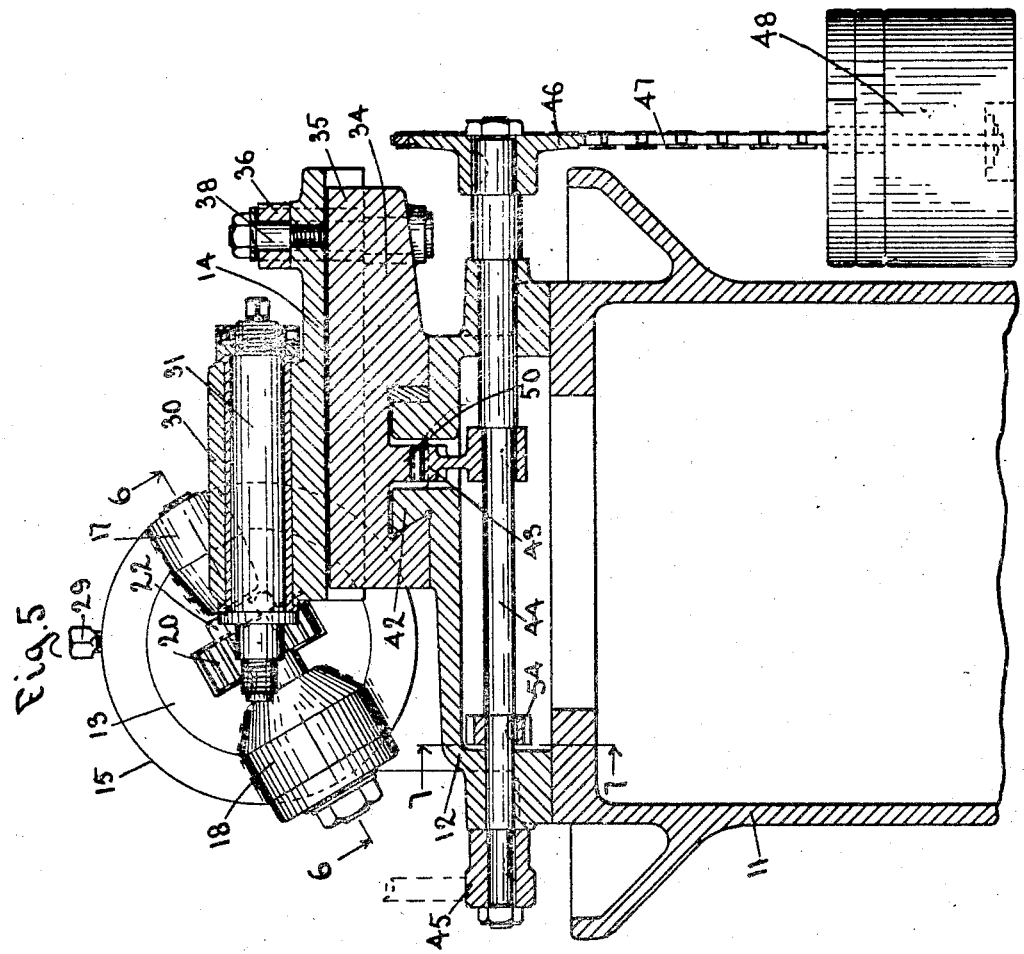
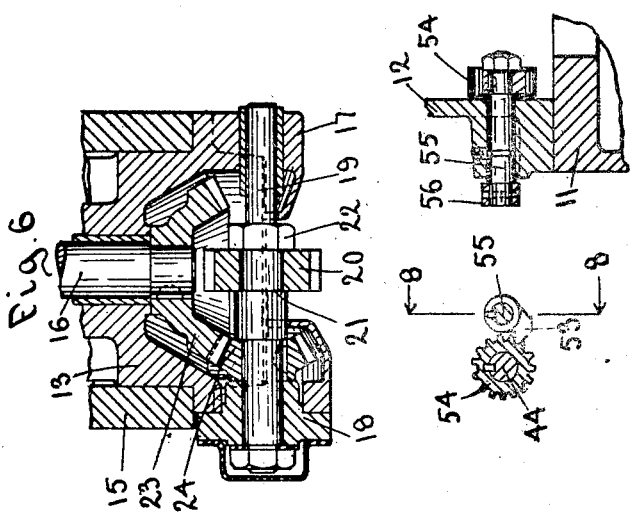
INVENTOR
Edwin R. Fellows
by Wright, Brown, Quinby & May
att'ys Patented May 29, 1934

1,960,841

UNITED STATES PATENT OFFICE 1,960,841

MACHINE FOR FINISHING GEARS

Edwin R. Fellows, Springfield, Vt., assignor to The Fellows Gear Shaper Company, Springfield, Vt., a corporation of Vermont Application December 19, 1925, Serial No. 76,459

4 Claims. (Cl. 29—90)

In the manufacture of cut gearing, minor inaccuracies of form and spacing of the gear teeth frequently occur, due to causes which cannot be avoided in even the most accurately constructed and carefully adjusted machines. Such inaccuracies causes more or less vibration and noise when the gears are first set up and run in the machinery for which they are provided; but these defects in unhardened gears disappear to a greater or less extent after the gears have been run for a long enough time, owing to the pressure to which their teeth are subjected in service; such pressure having the effect of smoothing out and pressing down the points in the tooth faces which project outside of the true curves.

This invention has for its object to provide means for treating gears in the course of their manufacture to the stage of a finished article, so that such inaccuracies and imperfections are removed before the gears are put into service. More particularly its object is to enable the gears to be treated by a pressing and rubbing action applied over a limited part only of the length of the tooth being treated and of the tooth of the operating tool, but with a progressive shifting of the point of pressure application along the length of both the work and the tool. Let me say that by the term "length" in this description I mean the dimension of the tooth from end to end of the work piece or tool, and not the radial dimension.

This object I accomplish by running the gear to be treated in mesh with a tool which is a master gear, preferably hardened, formed with tooth face curves of the greatest possible accuracy, preferably generated by grinding; which master gear has a non-parallel relationship to the work piece when in use. That is, when treating a straight spur gear, I employ a helical master gear as the tool, mounting such tool at such an angle to the plane in which the axis of the work is located that it will run properly in mesh with the work; and in the case of a helical gear as the work piece, I use a straight spur gear, or possibly a helical gear of a different or opposite equal helix angle to that of the work piece, as the tool. In either case, the tool and the work are located and run in different planes, at an angle to one another, and their axes are otherwise than parallel to one another. In thus using the work "plane" to identify the location of the gear, I define the plane of the gear, and likewise the plane of its rotation, as the plane midway between the ends of the gear and perpendicular to its axis; and also any plane between and parallel to the planes of the ends of the gear. Owing to the inclination or divergence from one another of the paths in which the meshing teeth of these members travel, such teeth come into bearing with one another progressively from one end to the other, whereby the pressing and rubbing actions are concentrated on limited areas of their surfaces, but are eventually distributed over such surfaces. In addition, I cause an endwise movement of the work to be carried on in order to distribute the rubbing and smoothing effect over the entire length of the tooth. The treatment thus carried out may be one of burnishing or one of abrading in the manner commonly known as lapping. The same tool is operable either as a lap or as a burnisher, depending on whether it is charged or supplied with fine abrasive in the well understood mode of lapping, or is applied to press and rub without any intermediate abrasive.

The invention consists in the method of treating gears as above set forth, and in a machine for carrying out the steps of such method.

In the drawings furnished with this specification, I have shown illustratively an operative machine embodying the principles of this invention and adapted to be used for performing the above described method.

Fig. 1 of the drawings is a longitudinal section of said machine, the planes on which the section is taken being indicated by the line 1—1 in Fig. 3;

Fig. 2 is a fragmentary side elevation showing a part of the machine;

Fig. 3 is a plan view of the entire machine, showing a spur gear as the burnisher for use with a helical gear;

Fig. 4 is a fragmentary view illustrating the use of a helical gear for burnishing a straight spur gear;

Fig. 5 is a cross section taken on line 5—5 of Fig. 3;

Fig. 6 is a fragmentary sectional view taken on line 6—6 of Fig. 5;

Fig. 7 is a fragmentary sectional view taken on line 7—7 of Fig. 5;

Fig. 8 is a section taken on line 8—8 of Fig. 7.

Like reference characters designate the same parts wherever they occur in all the figures.

Describing now the particular machine herein illustrated, the same comprises a pedestal or base 11 adapted to rest on the floor, a bed 12 mounted on said base, a tool head 13, and a work carriage 14. The tool head is mounted rotatably with capacity for complete rotation in a housing 15 which forms part of the base; and it contains a shaft 16 concentric with said housing, and also has bearings 17 and 18, in which is mounted a tool shaft or spindle 19 carrying a tool 20 in the form of a master gear. Said bearings 17 and 18 are constructed with provisions, well understood by those skilled in the art, by which they may be opened to permit placement and removal of the spindle 19, and substitution of different tools. The tool is clamped on the spindle between a shoulder 21 and a nut 22, and it may also be keyed to the spindle if desired.

The tool spindle crosses the end of the tool head and is driven from the shaft 16 by bevel gears 23 and 24, suitably keyed and secured to the shaft and spindle, respectively. The head 13 is rotatably adjustable in the housing 15, whereby the spindle may be placed at any inclination between the limits where it is vertical or horizontal. Means are shown for driving the shaft 16 in either direction, comprising pulleys 25 and 26 engaged with an open belt 27 and a crossed belt 28, respectively, which belts may be driven by pulleys on a counter shaft adapted to be independently clutched to such counter shaft and unclutched therefrom. Other driving means than this may, however, be used, as is well understood by those skilled in the art. A set screw 29, or equivalent clamp, secures the head in its various adjustments.

The carriage 14 is provided with a bearing 30, in which a work spindle 31 is rotatably mounted and suitably confined to prevent endwise movement. On one end of the work spindle, which protrudes from the bearing 30, is placed the work piece 32 and a clamping nut 33 for securing the work piece.

The carriage 14 and its bearing are so arranged that the work spindle 31 is perpendicular to the drive shaft 16 and in the same plane therewith, or preferably so, and so is parallel to the plane in which the tool spindle moves when being adjusted angularly. In the embodiment here illustrated, the shaft 16 and work spindle are both horizontal, and the tool spindle is adjustable angularly in a vertical plane; but these relations to the horizontal may be departed from and modified within the spirit and scope of this invention. The important fact is that the tool rotates, or may be placed so as to rotate, in a plane at any desired angle to the plane in which the work piece rotates and about an axis making any desired angle with the direction in which the axis of the work piece extends, but not in the same plane with the latter axis, or, more generally stated, that the intermeshing teeth of the tool and work travel in divergent paths so inclined to one another as to cause progressive contact from end to end of such teeth. The fact that the axes are in different planes while being inclined to one another is essential to effect this character of contact. A further characteristic, important in connection with a machine designed to treat a variety of different gears, is that the tool or the work, but preferably the tool, may be adjusted to various inclinations.

The carriage 14 is mounted on a slide 34 and embraces a guide 35 on said slide, which guide extends parallel to the work spindle and so enables the carriage to be moved, and to carry the work, back and forth longitudinally of the axis of the work. A lever 36 is pivoted to the carriage 14 by pivot 37, and is connected with the carriage 14 by a stud 38, whereby the carriage may be moved back and forth, as above stated; the lever having an elongated slot through which the stud 38 passes, to permit such movement while the lever swings in an arc.

A fixed stop 39 on the slide 34, between stops 40, 40, adjustably mounted in a longitudinal slot 41 in the edge of the carriage 14, limits the movements of the carriage by cooperation with said adjustable stops.

The slide 34 is mounted on the bed 12 and embraces a guide 42 on the bed, such guide extending transversely to the guide 35 and permitting the slide to be moved back and forth so as to bring the work piece up to the tool and remove it therefrom. For thus moving the slide, I provide a gear segment 43 on a shaft 44, an arm 45 on one end of said shaft, and a sprocket wheel or pulley 46 on the opposite end of said shaft, to the rim of which wheel is secured a cord or chain 47 suspending a weight 48. The gear segment 43 projects through an opening 49 in the upper side of the bed 12 and meshes with a rack 50 on the under side of the slide 34. The weight and its suspender are so applied to the shaft as to tend to advance the work toward the burnishing tool, while the arm 45, which is provided with a handle, is used to retract the slide so as to permit work pieces to be applied to and removed from the work spindle. A fixed stop 51 on the bed and a complemental stop 52 secured in a longitudinally adjustable manner to the slide 34, limit the movement of the slide toward the tool head, whereby to maintain a separation between the work spindle and the burnishing tool when there is no gear in place on the work spindle. A pawl 53 cooperates with a pinion 54, serving as a ratchet, on the shaft 44, to hold the slide in retracted position against the pull of the weight. This pawl is secured on a short rock shaft 55 having its bearing in the side of the bed and carrying on its outer end an arm 56 which serves both as a counterweight to hold the pawl up to the ratchet pinion and as a handle by which the pawl may be disengaged from the pinion when the work is to be brought up to the tool.

As previously stated, the tool is a master spur gear having accurate tooth faces, and of harder material or composition than the work piece. If the work piece is a straight spur gear, the tool is a helical gear, as shown in Fig. 4, while if the work piece is a helical gear, the tool is preferably a spur gear, as shown in Fig. 3, or it may be a helical gear of such inclination as to its teeth that it will rotate in a different plane from the work when in mesh with the latter. It is to be understood, of course, that in any case the pitch and pressure angle of the tool, considered as a gear, are the same respectively as the pitch and pressure angle of the gear to be burnished; and that different tools may be substituted for one another to treat gears of different pitches and different pressures angles.

In operation, a master gear is chosen which is conjugate to the work piece in the manner above indicated, when rotating in a different plane than that of the work piece, and the tool head is adjusted to bring the tool into the prescribed plane. Different tools are used for gears of different pitches, different forms of tooth curves, and different helix angles. The work piece is applied to the work spindle, and the slide is advanced until the teeth of the work piece contact on both faces with the flanking teeth of the tool; and the stops 40 are adjusted to arrest the reciprocating movement of the work before it has been brought in the course of such movement out of mesh with the tool. The slide 34 is advanced to bring the work into mesh with the tool, where it is held, with capability of yielding, by the action of the weight 48, whereby it is enabled to move as a whole back and forth when irregularities in the tooth faces came to bear on the tool. The tool is set in motion and it drives the work piece. In thus driving the work, the teeth of the tool come into bearing progressively lengthwise of the teeth of the work, due to the non-parallel relation between them and the helical teeth of one of them; the bearing area being thereby reduced to an extent much shorter than that occurring between straight gear teeth, but shifting progressively with the rotational progress of the meshing teeth. At the same time the work carriage is moved back and forth, so as to distribute the pressing effect further and more uniformly over the work. When action in this manner has been carried on long enough to rub and press down the irregularities of the gear wheel teeth on one side, to the desired extent, the direction of rotation may be reversed and the same action carried out on the other side of the teeth. In some cases, however, it is feasible to treat the second side of the teeth by replacing the work piece on its spindle in reversed position. Sufficient frictional or other resistance to the rotation of the work spindle may be applied by any suitable means to effect such pressure between the teeth of the tool and work to effect the desired burnishing action within suitable time limits. But, without either such resistance or reversal, the action of rubbing both sides of the teeth, or tooth spaces, may be performed at once by forcing the work against the tool so that the teeth of each are crowded into the spaces of the other.

The principles of this invention may be embodied in a machine which is automatic as to the operation of reciprocating the work during the burnishing action, and also in one which is automatic as well in the actions of bringing the work up to the tool and of withdrawing the work and stopping the machine after running for a given length of time. Other additions or modifications in the machine may be made without departure from the spirit of this invention; including such as will enable it to perform the character of rubbing operation herein explained upon gear teeth of other types than spur gears, and the substitution of other constructions and arrangements of parts, or the substitution of mechanical equivalents for the various forms of means here shown, adapted to obtain the same results in substantially the same way as hereinbefore described within the scope of the appended claims.

What I claim and desire to secure by Letters Patent is:

1. A machine for smooth finishing helical gears comprising a work spindle adapted to hold the gear to be finished, a tool spindle at an angle to the work spindle in a different plane therefrom, a tool in the form of a straight spur master gear mounted on said tool spindle, and means for driving said tool spindle rotatably; the said angle of the tool spindle being equal to the helix angle of the gear to be finished, and being sufficiently oblique to the work spindle to enable the tool to drive the work rotatably by action of their respective intermeshing teeth.

2. A machine for smooth finishing gears comprising a work spindle adapted to hold a helical gear to be finished, a tool spindle arranged at one side of said work spindle in a different plane therefrom and at an inclination equal to the helix angle of the gear to be finished, a tool in the form of a straight spur master gear mounted on said tool spindle, means for driving said tool spindle rotatably, and means for exerting pressure between the work and the tool in the direction transverse to their respective axes; the said inclination of the tool spindle being such as to permit the tool to drive the work rotatably by the action of their intermeshing teeth.

3. A machine for smooth finishing helical gears comprising a work spindle adapted to hold a gear to be finished, a tool spindle at an angle to the work spindle in a different plane therefrom, such angle being oblique in a degree such as to permit a spur gear on the tool spindle to drive a helical gear on the work spindle by action of their intermeshing teeth, a tool in the form of a straight spur master gear mounted on said tool spindle adapted to mesh with a helical gear on said work spindle, and means for exerting force on the work spindle in a direction to crowd the teeth of the work piece into the spaces between the teeth of the tool.

4. A gear finishing machine comprising work and tool spindles arranged in different planes at an angle to each other and adapted to carry respectively a gear to be finished and a tool in the form of a master gear, one of said gears having a plurality of helical teeth, the helix angle of which is equal to the inclination between said spindles, means for driving the tool spindle, and means for exerting yielding force on the tool spindle so as to crowd the teeth of the work piece into the tooth spaces of the tool; the work spindle being rotatably driven only by the intermeshing action of the tool and work piece.

EDWIN R. FELLOWS.